United States Patent [19]

Rieve et al.

[11] 3,847,795

[45] Nov. 12, 1974

[54] HYDROCRACKING HIGH MOLECULAR WEIGHT HYDROCARBONS CONTAINING SULFUR AND NITROGEN COMPOUNDS

[75] Inventors: Robert W. Rieve, Springfield; Harold Shalit, Drexel Hill, both of Pa.

[73] Assignee: Atlantic Richfield Company, Los Angeles, Calif.

[22] Filed: Apr. 13, 1973

[21] Appl. No.: 351,075

[52] U.S. Cl. .............................................. 208/108
[51] Int. Cl. ............................................ C10g 13/08
[58] Field of Search .................................... 208/108

[56] References Cited
UNITED STATES PATENTS

| | | | |
|---|---|---|---|
| 1,869,799 | 8/1932 | Danner | 208/108 |
| 2,191,156 | 2/1940 | Pier et al. | 208/108 |
| 2,964,462 | 12/1960 | Thomas et al. | 208/108 |
| 2,692,224 | 10/1954 | Heinemann | 208/112 |
| 3,409,684 | 11/1968 | Aristoff et al. | 260/667 |

FOREIGN PATENTS OR APPLICATIONS

| | | | |
|---|---|---|---|
| 299,021 | 2/1929 | Great Britain | 208/108 |

*Primary Examiner*—Delbert E. Gantz
*Assistant Examiner*—James W. Hellwege
*Attorney, Agent, or Firm*—Delbert E. McCaslin

[57] ABSTRACT

Method for the hydrocracking of high molecular weight hydrocarbons containing large amounts of sulfur and nitrogen compounds by contacting such hydrocarbons at elevated temperatures and elevated hydrogen pressures with a catalyst soluble in such hydrocarbons at the cracking conditions produced from palladium chloride and aluminum chloride.

8 Claims, No Drawings

HYDROCRACKING HIGH MOLECULAR WEIGHT HYDROCARBONS CONTAINING SULFUR AND NITROGEN COMPOUNDS

BACKGROUND OF THE INVENTION

The hydrocracking of crude oil, heavy residua, shale oils, tars, coal derived liquids, tar or tar sands derived liquids and other high molecular weight hydrocarbon stocks containing large amounts of sulfur and nitrogen compounds is not practical even with the best known heterogeneous catalysts. These heavy hydrocarbon feed stocks must first be treated to remove substantially all of the nitrogen and sulfur compounds and to reduce their aromaticity, in particular the high molecular weight polynuclear condensed aromatics.

The nitrogen and sulfur compounds which are most troublesome are those wherein the nitrogen or sulfur is in a heterocyclic ring and such compounds together with the condensed ring aromatics are strongly adsorbed on the catalyst surface thereby effectively blocking it for its intended use in cracking. In order to overcome this situation extremely severe reaction conditions are required and these result in the production of large amounts of gas and coke. In addition, the use of such severe conditions can also harm the activity of the catalyst which not only affects the yield of the desired boiling range naphtha product but requires more frequent replacement of the catalyst.

These problems have long been recognized and the patented art is replete with proposed methods and catalysts for obviating these difficulties. For example, U.S. Pat. No. 2,692,224 shows hydrocracking of high boiling hydrocarbons including residua using a catalyst such as platinum on charcoal and an acidic compound such as hydrogen fluoride, bromine or a Friedel-Crafts catalyst, i.e., a heterogeneous catalyst and a homogeneous catalyst mixture. A similar catalyst was used in U.S. Pat. No. 3,409,684 for the partial hydrogenation of aromatic compounds, in particular, condensed ring aromatics. Many other patents describe heterogeneous catalysts which are combinations of supported noble metals with catalysts such as aluminum chloride for catalyzing various reactions, but as far as is known, none of these teaches the instant invention of hydrocracking high molecular weight hydrocarbons containing large amounts of sulfur and nitrogen compounds using as the catalyst a complex of palladium chloride and aluminum chloride which gives a homogeneous system, i.e., the catalyst is soluble at reaction conditions.

Thus the instant invention avoids the prior art problems since the catalyst combination does not possess a typical heterogeneous surface to strongly adsorb sulfur or nitrogen compounds or condensed ring aromatics and consequently is not poisoned by their presence. This in turn permits the use of milder conditions and, accordingly, lessens coke and light gas formation.

SUMMARY OF THE INVENTION

This invention relates to the hydrocracking of high molecular weight hydrocarbons, i.e. those boiling above about 400° F. and including those boiling above 800° – 900° F. wherein such hydrocarbon stocks contain relatively large amounts of sulfur and nitrogen, i.e., ranging from 0.3 combined weight per cent sulfur and nitrogen for so-called sweet crudes up to 0.75 combined weight per cent for certain stocks to 1.5 and higher for residua, shale oils and the like, utilizing a homogeneous catalyst system comprising a palladium chloride-aluminum chloride complex catalyst which is soluble in the hydrocarbon reaction medium at hydrocracking conditions. The invention is further characterized by the fact that the catalyst complex is not significantly poisoned by the sulfur and nitrogen compounds and by the additional advantage that the catalyst can be recovered easily for reuse without any substantial loss in activity.

It is an object of this invention, therefore, to provide a method for hydrocracking high molecular weight hydrocarbons containing large amounts of sulfur and nitrogen compounds.

It is another object of this invention to provide a method for hydrocracking high molecular weight hydrocarbons containing large amounts of sulfur and nitrogen compounds without the formation of excessive amounts of coke and light gas.

It is another object of this invention to provide a method for hydrocracking high sulfur and nitrogen content high molecular weight hydrocarbon stocks utilizing a homogeneous catalyst system.

It is another object of this invention to provide a method for the hydrocracking of high molecular weight hydrocarbons containing large amounts of sulfur and nitrogen compounds utilizing a catalyst comprising a palladium chloride-aluminum chloride complex.

Other objects of this invention will be apparent from the detailed description of the invention which follows and from the claims.

DESCRIPTION OF THE INVENTION

This invention is directed to the hydrocracking of high molecular weight hydrocarbon stocks particularly characterized by having large amounts, i.e., ranging from a minimum of 0.3 to 1.5 combined weight per cent to very large amounts such as 20 combined weight per cent, for example, of sulfur and nitrogen combined. In general, the stocks are characterized by having a boiling point for the predominant portion of the stock in excess of 400° F. Feed stocks such as full boiling range crudes containing 40 volume per cent or more in the boiling range up to 400° F. can, of course, be processed by the method of this invention, but the purpose of the invention is to hydrocrack the fractions boiling above 400° F. to produce motor fuel boiling in the gasoline boiling range, i.e., having an end point of about 400° F. Hence the method has its greatest value in hydrocracking the heavier or high molecular weight fractions. Moreover, these fractions tend to contain the heterocyclic sulfur and nitrogen compounds. Thus examples of stocks which are particularly suitable for hydrocracking by the method of this invention are the so-called sour crude oils, i.e., high sulfur crudes, shales oils since these are well known to have high nitrogen contents, tars such as those extracted from tar sands, for example the widely publicized Athabaska tar sands of Canada, synthetic crude oils such as those derived from coal, lignite and similar mineral deposits, residua obtained by "topping" a crude, i.e., the residue after removing by distillation the lower boiling hydrocarbons from crude oils, or the residua produced from other conventional petroleum refining processes and any similar high molecular weight hydrocarbonaceous stocks.

The instant process can operate at temperatures in the range of from 400° to 1,200° F. with from 500° to 1,000° F. being somewhat more preferred. Hydrogen pressures in the range of from 100 psig to 5,000 psig can be employed with from 500 psig to 3,000 psig being preferred for most charge stocks and with certain stocks even less severe conditions, i.e., 500 psig to 1,000 psig being completely satisfactory.

The ratio of hydrogen to hydrocarbon charge can range from 100 to 5,000 SCF (standard cubic feet) of hydrogen per barrel of hydrocarbon charge with a preferred range being from 300 to 1,500 SCF per barrel.

The catalyst is prepared initially by simply admixing the palladium chloride, $PdCl_2$, and anhydrous aluminum chloride, $AlCl_3$, in a hydrocarbon medium such as the feed stock under hydrogen. At the elevated temperatures suitable for hydrocracking, these compounds apparently form a complex which is the active catalyst for the hydrocracking reaction. It is also theorized as will be discussed hereinafter that these compounds may also complex to some extent with hydrocarbon. It has been found that molar ratio of aluminum chloride to palladium chloride should be at least 2:1 but preferably a much higher molar ratio for example 100:1 or more should be employed since, as is well known, aluminum chloride itself tends to complex with hydrocarbons and thus there may be some loss in continuous processing. It has also been found that if initially the palladium is in its zero valence state, i.e., the metal, it is considerably less effective hence it is employed in its +2 valence state as in $PdCl_2$ to produce the active catalyst with the aluminum chloride.

In the prior art, various supported noble metal and other hydrogenation catalysts were made equivalent, i.e., nickel, platinum, palladium, rhodium and the like. This has not been found to be true for this invention since palladium chloride is distinctly unique and advantageous.

Likewise in the prior art it has been proposed that any Lewis acid compound could be combined with the supported hydrogenation catalysts, in particular, a Friedel-Crafts type compound. In the instant invention anhydrous aluminum chloride has been found to be unique in its ability to form a complex with the palladium chloride to give the highly active hydrocracking catalyst.

The palladium chloride is, of course, the more costly component of the catalyst of this invention but only catalytic amounts are required, for example 0.001 per cent by weight of palladium based on the weight of the hydrocarbon charge can be used satisfactorily. Amounts up to 1.0 weight per cent based on the weight of the charge can be used but such high concentrations are not ordinarily required. The amount of aluminum chloride can be as small as 2 moles per mole of the palladium chloride but preferably an excess is employed, for example, from 0.005 weight per cent based on the weight of the hydrocarbon charge up to as much as 10 weight per cent. Such high concentrations are not required and may be wasteful so concentrations from about 0.05 to 6.0 weight per cent based on the charge are completely satisfactory.

The hydrocracking process of this invention can be carried out by batch, semi-batch, or continuous methods. Since the catalyst is soluble there is not, of course, a catalyst bed but it is necessary for the hydrocarbon charge to remain in contact with the catalyst for a time sufficient to accomplish the desired degree of hydrocracking. Obviously the reaction time will vary with the type of charge stock, the severity of the reaction conditions (temperature and hydrogen pressure) as well as the degree of cracking desired. In general, therefore, reaction times can vary rather widely ranging from 2 to 3 seconds to 18 hours, with from 1 minute to 1 hour being satisfactory under continuous flow conditions. In batch or semi-continuous operations considerably longer times are required. Likewise some stocks hydrocrack far more readily and thus require much less time. Since commercially it is generally more economical to employ continuous flow, considerable flexibility may be required to be engineered into the system if a variety of feed stocks of widely differing compositions are to be processed in a single unit. This, however, is within the scope of the knowledge of those skilled in this art.

Since the catalyst is soluble in the hydrocarbon feed and/or products at reaction conditions it requires special means for recovery and reuse. The catalyst of this invention, however has a unique set of properties which greatly simplifies its recovery. The catalyst, although soluble at reaction temperatures, becomes insoluble at lower temperatures, for example, at about 250° F. and below. By cooling the products to this temperature and removing all but a small bottoms fraction, such as a 10 to 15 volume per cent bottoms or even less, the catalyst is concentrated in this fraction which is then recycled to contact fresh hydrocarbon charge.

It is not known whether the catalyst is merely in the form of a palladium chloride-aluminum chloride complex or whether it is further complexed with hydrocarbon, however, it readily redissolves and disperses in the hot hydrocarbon charge without apparently any loss in activity. In a semi-continuous series of runs employing this technique, which runs were terminated only because of the lengthy time involved, the equivalent of 130 barrels of hydrocarbon charge per pound of palladium were processed with no loss in catalyst activity. This demonstrates that even if eventually the activity of the catalyst decreases to the point where it can no longer be used or if additional catalyst is required to make-up for losses, the catalyst cost per barrel of charge processes in not only completely competitive economically with present hydrocracking catalysts, but moreover, the instant process has the highly advantageous ability to process high molecular weight hydrocarbon stocks containing large amounts of sulfur and nitrogen compounds as well as condensed ring aromatics without any pre-treatment process now required before such stocks can be hydrocracked with the conventional heterogeneous catalysts now in use.

The following examples are provided for the purpose of further illustrating the invention, but it is to be understood that these are not to be construed as limiting the invention to their disclosures.

EXAMPLE I

In order to demonstrate that the catalyst of this invention can be used to hydrocrack raw petroleum crude oils a series of runs was carried out on a crude having combined sulfur and nitrogen at the lower end of the range, i.e., Barbers Hill Crude (this Example), and a crude having a combined sulfur and nitrogen at the higher end of the minimum, i.e., a West Texas Permian Crude (Example II) using a batch system with an autoclave pressured with hydrogen to the desired pressure. The Barbers Hill Crude had an API Gravity at 60° F. of 28.5, a volume per cent overhead at 400° F. of 16.7, weight per cent sulfur 0.27, weight per cent nitrogen 0.07 and volume per cent boiling above 900° F of 16.5. Runs 1 and 2 were for catalyst comparative purposes while run 3 utilized the catalyst of this invention made from palladium chloride and aluminum chloride. The conditions and results are shown in Table I.

TABLE I

| Conditions: | Run 1 | Run 2 | Run 3 |
|---|---|---|---|
| $PdCl_2$ (Wt. % of Crude) | 0.095 | None | 0.095 |
| $AlCl_3$ (Wt. % of Crude) | none | 5.7 | 5.7 |
| Temperature ° F. | 400 | 400 | 400 |
| $H_2$ Pressure, psig | 1600 | 1625 | 1500 |
| Time (Hrs.) | 8.5 | 8.5 | 8.0 |
| Products: | | | |
| API Gravity at 60° F. | 28.7 | 31.8 | 48.3 |
| Vol. % overhead at 400° F. | | | 60.5 |
| Vol. % boiling above 900° F. | | | 6.0 |

These data show that palladium chloride alone is ineffective for hydrocracking (no change in API Gravity) while $AlCl_3$ alone gives very little cracking of the crude. This result was of particular importance since aluminum chloride alone has been proposed frequently as a cracking catalyst. The combination however, run 3, even under a slightly lower pressure and shorter reaction time produced a high volume of product boiling up to 400° F., i.e., in the naphtha range with a large decrease in the amount boiling above 900° F. The light gas production ($C_1$ to $C_3$ hydrocarbons) was less than 4 weight per cent and coke production was less than 3 weight per cent. Thus this example demonstrates the value of the instant catalyst in hydrocracking high molecular weight stocks.

EXAMPLE II

In these runs a full boiling range West Texas Permian Crude was processed in the same manner as shown in Example I except that no check runs on catalyst compositions were made. The crude had an API Gravity at 60° F. of 34.6, volume per cent overhead at 400° F. of 37.2, weight per cent sulfur of 1.4, weight per cent nitrogen of 0.1 and volume per cent boiling above 900° F. of 22.0. The conditions and results are shown in Table II.

TABLE II

| Conditions: | Run 1 | Run 2 |
|---|---|---|
| $PdCl_2$ (Wt. % of Crude) | 0.0585 | 0.0585 |
| $AlCl_3$ (Wt. % of Crude) | 1.7 | 1.7 |
| Temperature °F. | 500 | 600 |
| $H_2$ Pressure, psig | 1500 | 1500 |
| Time, (Hrs.) | 8.0 | 8.0 |
| Products: | | |
| API Gravity at 60° F. | 45.3 | 51.4 |
| Volume % overhead at 400° F. | 46.5 | 60.0 |
| Volume % boiling above 900° F. | 17.5 | 9.0 |

Again it is clear that considerable hydrocracking was obtained, Run 2 showing excellent results because of the higher temperature. Not only was the volume per cent overhead at 400° F. increased in these runs but the volume boiling above 900° F. greatly decreased. As in Example I the light gas ($C_1$ to $C_3$'s) was less than 4 weight per cent and the coke production less than 3 weight per cent.

It is well known that typical hydrocracking catalysts, such as palladium on molecular sieves, would be ineffective under these conditions for hydrocracking crude oils. Moreover, more rugged but less selective catalysts of the cobalt-molybdenum type would require higher temperatures and pressures with the result selectivity to naphthas would be far poorer.

The following Example shows that the method of this invention is effective for hydrocracking extremely high molecular weight feeds such as crude oil residua.

EXAMPLE III

A resid from a Lagomedio crude, 100 volume per cent boiling above 800° F. with a range above 1,000° F., an API Gravity at 60° of 7.3 and containing 3.1 weight per cent sulfur and 0.94 weight per cent nitrogen was hydrocracked as described in Examples I and II. The conditions and products obtained are shown in Table III.

TABLE III

| Conditions: | Run 1 | Run 2 |
|---|---|---|
| $PdCl_2$ (Wt. % of Resid) | 0.0167 | 0.0334 |
| $AlCl_3$ (Wt. % of Resid) | 5.0 | 0.24 |
| Temperature ° F. | 600 | 750 |
| $H_2$ Pressure, psig | 1300 | 3000 |
| Time (Hrs.) | 18 | 16 |
| Products: | | |
| API Gravity at 60° F. | 15.9 | 22.8 |
| Light Gas ($C_1$ to $C_3$'s) Wt. % | | 5.1 |
| $C_4$ to 800° F., vol. % | | 64.7 |
| Vol. % boiling above 800° F. | | 26.6 |
| Coke, Wt. % | | 3.5 |
| Sulfur, Wt. % | | 1.8 |
| Nitrogen, Wt. % | | 0.49 |

It will be seen that the resid was extensively converted to a gas oil boiling below 800° F. with only minor yields of gas and coke. The sulfur and nitrogen contents remaining in the cracked products are typical of the instant catalyst system and its unique nature. Conventional, heterogeneous catalysts strongly adsorb these compounds so they are essentially completely removed before the catalyst is free to react with the hydrocarbons. It is clear that this "poisoning" effect which occurs with conventional heterogeneous catalysts is absent with the instant catalyst since conventional catalysts would be useless in the cracking of a resid of the type shown.

Run 1 shows some hydrocracking but shows the need for more severe conditions as employed in Run 2. Run 2 was repeated a number of times by cooling the reactor to 250° F. removing all but a small bottoms fraction and then charging fresh resid. As has been described, the catalyst remains in this bottoms fraction and thus it was found that even when processing the equivalent of 130 barrels of resid per pound of palladium by this technique there was no observable significant loss in activity of the catalyst.

We claim:

1. A method of hydrocracking high molecular weight hydrocarbons containing sulfur and nitrogen compounds which comprises contacting said hydrocarbons at temperatures in the range of from 400° to 1,200° F. at pressures in the range of from 100 psig to 5,000 psig with from 100 to 5,000 standard cubic feet of hydrogen per barrel of hydrocarbon charge in the presence of a catalyst soluble in said hydrocarbons at said temperatures, said catalyst being produced from a mixture of aluminum chloride and palladium chloride wherein in the palladium chloride-aluminum chloride catalyst the palladium ranges from 0.001 to 1.0 weight per cent based on the weight of the hydrocarbon charge and the aluminum chloride ranges from 0.005 to 10.0 weight per cent based on the weight of the hydrocarbon charge with the molar ratio of aluminum chloride to palladium chloride being at least 2:1.

2. The method according to claim 1 wherein said high molecular weight hydrocarbons boil predominantly above 400° F.

3. The method according to claim 2 wherein said high molecular weight hydrocarbons are a crude oil containing a minimum of from 0.3 to 1.5 combined weight per cent sulfur and nitrogen based on the weight of said crude.

4. The method according to claim 1 wherein said high molecular weight hydrocarbons boil above 400° F. and contain more than 1.5 combined weight per cent of sulfur and nitrogen.

5. The method according to claim 4 wherein said hydrocarbons boil above 800° F.

6. The method according to claim 1 wherein said high molecular weight hydrocarbons boil predominantly above 400° F. and contain a minimum of from 0.3 to 1.5 combined weight per cent sulfur and nitrogen based on the weight of said hydrocarbons, said hydrocracking being carried out at temperatures in the range of from 500° F. to 1,000° F. at pressures in the range of from 500 psig to 3,000 psig with from 300 to 1,500 standard cubic feet of hydrogen per barrel of hydrocarbon charge and in the palladium chloride-aluminum chloride catalyst the palladium ranges from 0.001 to 1.0 weight per cent based on the weight of the hydrocarbon charge and the aluminum chloride ranges from 0.05 to 6.0 weight per cent based on the weight of the hydrocarbon charge with the mole ratio of aluminum chloride to palladium chloride being at least 2:1.

7. The method according to claim 6 wherein said hydrocarbons boil above 400° F. and contain more than 1.5 combined weight per cent sulfur and nitrogen based on the weight of the hydrocarbon charge.

8. The method according to claim 7 wherein said hydrocarbons boil above 800° F.

* * * * *